(12) United States Patent
Nagasaka et al.

(10) Patent No.: US 9,403,130 B2
(45) Date of Patent: Aug. 2, 2016

(54) METHOD OF MANUFACTURING SILICA MEMBRANE

(75) Inventors: Ryujiro Nagasaka, Nagoya (JP); Tatsuya Hishiki, Nagoya (JP); Ichiro Wada, Kariya (JP)

(73) Assignee: NGK Insulators, Ltd., Nagoya (JP)

( * ) Notice: Subject to any disclaimer, the term of this patent is extended or adjusted under 35 U.S.C. 154(b) by 711 days.

(21) Appl. No.: 13/242,552

(22) Filed: Sep. 23, 2011

(65) Prior Publication Data

US 2012/0009346 A1    Jan. 12, 2012

Related U.S. Application Data

(63) Continuation of application No. PCT/JP2011/051718, filed on Jan. 28, 2011.

(30) Foreign Application Priority Data

Mar. 24, 2010    (JP) ................. 2010-067812

(51) Int. Cl.
B01D 71/02  (2006.01)
B01D 67/00  (2006.01)
B01D 69/12  (2006.01)

(52) U.S. Cl.
CPC .......... *B01D 71/027* (2013.01); *B01D 67/0046* (2013.01); *B01D 67/0095* (2013.01); *B01D 69/12* (2013.01); *B01D 2323/08* (2013.01)

(58) Field of Classification Search
USPC ............................ 427/244–246, 377; 502/439
See application file for complete search history.

(56) References Cited

U.S. PATENT DOCUMENTS

| | | | |
|---|---|---|---|
| 4,990,252 A * | 2/1991 | Tomaschke et al. | 210/321.83 |
| 5,772,735 A | 6/1998 | Sehgal et al. | |
| 7,740,827 B2 * | 6/2010 | Felthouse et al. | 423/522 |
| 2002/0142172 A1 | 10/2002 | Brinker et al. | |
| 2003/0022951 A1 * | 1/2003 | Coowar et al. | 521/27 |
| 2008/0069950 A1 * | 3/2008 | Tanaka | 427/246 |

FOREIGN PATENT DOCUMENTS

| | | |
|---|---|---|
| JP | 2004-168615 A1 | 6/2004 |
| JP | 2008-246304 A1 | 10/2008 |
| JP | 2009-226306 A1 | 10/2009 |
| JP | 2009-241054 A1 | 10/2009 |
| JP | 2009-263598 A1 | 11/2009 |
| WO | WO 2007035949 A2 * | 3/2007 |
| WO | 2007/094267 A1 | 8/2007 |
| WO | WO 2007094267 A1 * | 8/2007 |
| WO | 2008/050814 A1 | 5/2008 |
| WO | 2010/125898 A1 | 11/2010 |

OTHER PUBLICATIONS

Thomas F. Protzman and George L . Brown, An Apparatus for the Determination of the Minimum Film Temperature of Polymer Emulsions, Journal of Applied Polymer Science, vol. IV, Issue No. 10, pp. 81-85 (1960).*
Japanese Office Action (Application No. 2011-541427) dated Sep. 16, 2014.

* cited by examiner

*Primary Examiner* — Alex A Rolland
(74) *Attorney, Agent, or Firm* — Burr & Brown, PLLC

(57) ABSTRACT

A simple method of manufacturing a silica membrane which has high separation performance and high permeation flux is provided. The method is a method for manufacturing a silica membrane by depositing a silica sol on a porous substrate, drying the silica sol by air blowing which has a dew point of -70 to 0° C., and then firing the same thereafter to produce the silica membrane. Further, the silica sol is preferably dried by air blowing at an air velocity of 5 to 20 m/sec.

5 Claims, 3 Drawing Sheets

METHOD OF MANUFACTURING SILICA MEMBRANE

BACKGROUND OF THE INVENTION

1. Field of the Invention

The present invention relates to a method of manufacturing a silica membrane, and more particularly to a method of manufacturing a silica membrane which has high separation performance and high permeation flux.

2. Description of Related Art

To separate a specific component from a mixed liquid containing a plurality of liquid components, a ceramic porous membrane made of a highly corrosive-resistant ceramic material, such as silica, alumina, cordierite, mullite, or silicon carbide, is used as a separation membrane (filter) for the dehydration from, for example, alcohol or an organic solvent.

The ceramic porous membrane is formed by depositing a ceramic sol onto a porous substrate, drying the ceramic sol, and then firing the same. The ceramic porous membrane is usually used integrally with the porous substrate, which serves as the support thereof.

As a method for depositing a silica sol, there has been known a method for forming a membrane by pouring a silica-sol liquid into a porous substrate by allowing the same to fall by its own weight (Patent Document 1). There has been known another method whereby a coating liquid prepared by diluting a ceramic sol concentrate solution by isopropyl alcohol is deposited and dried by air blowing (Patent Document 2).

PRIOR ART DOCUMENTS

Patent Documents

Patent Document 1: WO2008/050814 pamphlet
Patent Document 2: JP-A-2008-246304

According to Patent Document 1, the separation factor cannot be said sufficiently high, and a separation membrane with a higher separation factor has been called for. There is an available method whereby to repeat the coating of membranes to obtain a membrane with a higher separation factor. However, as the number of repetitions of coating the membranes increases, permeation flux deteriorates. The method disclosed in Patent Document 2 is a method of producing a ceramic porous membrane which has less defects, a thin and uniform film thickness, and small pore diameters, and the method therefore can hardly be said to provide satisfactory conditions for obtaining a membrane with a higher separation factor.

An object of the present invention is to provide a simple method of manufacturing a silica membrane which has high separation performance and high permeation flux.

SUMMARY OF THE INVENTION

The present inventors have discovered that the aforesaid object can be fulfilled by air blowing which has a dew point of −70 to 0° C. onto a silica sol deposited on a porous substrate to dry the silica sol. In other words, the present invention provides a method of manufacturing a silica membrane described below.

[1] A method of manufacturing a silica membrane by depositing a silica sol on a porous substrate, drying the silica sol by air blowing which has a dew point of −70 to 0° C. and then firing the same thereby to produce a silica membrane.

[2] A method of manufacturing a silica membrane described in the aforesaid [1], wherein the silica sol is dried by the air blowing having an air velocity of 5 to 20 m/sec.

Drying a silica sol by using air which has a dew point of −70 to 0° C. allows a membrane having high separation performance (a high separation factor) to be obtained, thus making it possible to obtain a silica membrane which is thinner than a conventional one and which has higher separation performance. A membrane with a still higher separation factor can be obtained by air blowing at an air velocity of 5 to 20 m/sec.

DETAILED DESCRIPTION OF THE INVENTION

The following will describe an embodiment of the present invention with reference to the accompanying drawings. The present invention is not limited to the following embodiments, and can be changed, modified, or improved without departing from the scope of the invention.

The method of manufacturing a silica membrane 1 in accordance with the present invention is a method whereby to produce the silica membrane 1 by applying a silica sol to a porous substrate 11, drying the silica sol by air blowing having a dew point of −70 to 0° C., and then firing the same. Here, the dew point indicates a temperature at which the water vapor partial pressure in the air becomes equal to saturation pressure and also indicates a temperature at which the condensation of the water vapor is observed when the temperature of the air containing the water vapor is lowered.

In a dried state, the temperature of the membrane surface lowers due to the vaporization of a solvent, such as ethanol, contained in the silica sol, causing the moisture in the drying air to be condensed to water droplets, which adhere to the membrane surface. Thus, the difference in surface tension between the water droplets and the solvent, such as ethanol, causes the sequences of silica particles to be disturbed, resulting in the occurrence of a defect. The low dew-point drying (the dew point in the range of −70 to 0° C.) prevents dew condensation so as to restrain occurrence of defects, thus making it possible to reduce the number of times of coating required to obtain the silica membrane 1 free of defects. In other words, drying the silica sol by using air which has the dew point of −70 to 0° C. allows a membrane with high separation performance (a high separation factor) to be obtained, so that the silica membrane 1 which is thinner than a conventional one and has high separation performance can be obtained. If the dew point of air is the membrane surface temperature or lower (<−70° C.), then a separation factor which is only approximately the same as that obtained when drying with air of a −70° C. dew point would be obtained, whereas higher initial cost would be required, leading to less cost-effectiveness. For this reason, it is preferred to use air having the dew point ranging from −70 to 0° C.

Further, the silica sol is preferably dried by air blowing at an air velocity of 5 to 20 m/sec. Air blowing at that air velocity makes it possible to obtain a membrane having a higher separation factor. If the air velocity is below 5 m/sec, then it is difficult for the drying of the silica sol on the surface of the porous substrate 11 to proceed, frequently leading to formation of a membrane with large pore diameters rather than a dense membrane. On the other hand, an air velocity exceeding 20 m/sec causes fast drying, frequently causing cracks to occur in the membrane surface.

Figure 1:
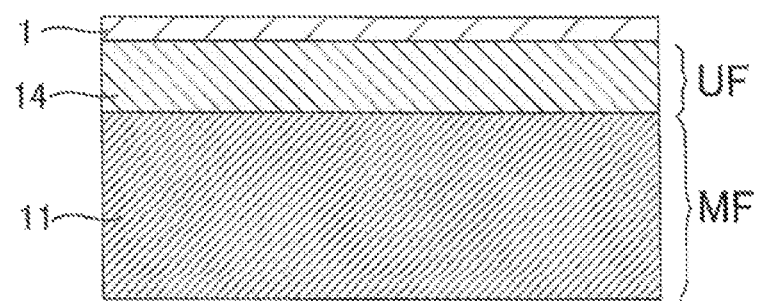
FIG. 1 is a sectional view of a ceramic filter, which is an embodiment of the present invention.

FIG. 1 illustrates the silica membrane 1 formed by the manufacturing method in accordance with the present invention. A UF membrane 14, which is an ultrafiltration membrane having pore diameters of 0.5 to 20 nm, is formed on a microfiltration membrane (MF membrane) of the porous substrate 11, and the silica membrane 1 is formed on the UF membrane 14. For the UF membrane 14, titania, for example, may be adopted. The silica membrane 1 has a multilayer structure composed of a plurality of laminated silica sol layers.

When the silica membrane 1 is formed on the UF membrane 14 as described above, the surface of the UF membrane 14 is flat and smooth and has few defects, thus permitting the silica membrane 1 to be formed into a thin membrane free of defects. This means that the silica membrane 1 can be formed to display high separation performance and high permeation flux at reduced cost.

Meanwhile, if the silica membrane 1 was formed on the microfiltration membrane (MF membrane) of the porous substrate 11 without forming the UF membrane 14 thereon, then a ceramic layer would be inevitably thick in covering the entire surface of the MF membrane by the silica membrane 1 because of the uneven surface of the MF membrane, resulting in poor permeation flux. In addition, the uneven surface of the MF membrane would cause an inhomogeneous silica membrane 1, easily leading to the occurrence of defects, such as cracks. This means low separation performance. Further, only a thin membrane could be formed at a time in order to prevent cracks from occurring. In other words, the number of steps would unavoidably increase, resulting in higher cost. Preferably, therefore, the UF membrane 14 is formed and then the silica membrane 1 is formed using the surface of the UF membrane 14 as the surface of the base member thereof.

Forming the silica membrane 1 on the UF membrane 14 by using the UF membrane 14 as the substrate for producing the silica membrane 1 makes it possible to form the silica membrane 1 with fewer defects, that is, the silica membrane 1 with high separation performance. The uppermost surface layer of the substrate serves the base layer, on which the membrane is formed, and is the UF membrane 14. Further, according to a method in which a slurry is brought into contact by being poured down from above a substrate, which will be discussed later, the surface of the substrate on which a membrane is to be formed is not subjected to a water pressure. Hence, a silica sol merely infiltrate into the UF membrane 14 due to a capillary force, thus restraining permeation into the substrate with larger pores (e.g., the porous substrate 11). Moreover, even when a lengthy substrate is used, the possibility of a difference in the deposited quantities of the silica sol between top and bottom will be minimized, making it possible to obtain a membrane which is homogeneous in the lengthwise direction. Further, drying by air blowing enables the silica membrane 1 to be a dense membrane.

Figure 2:
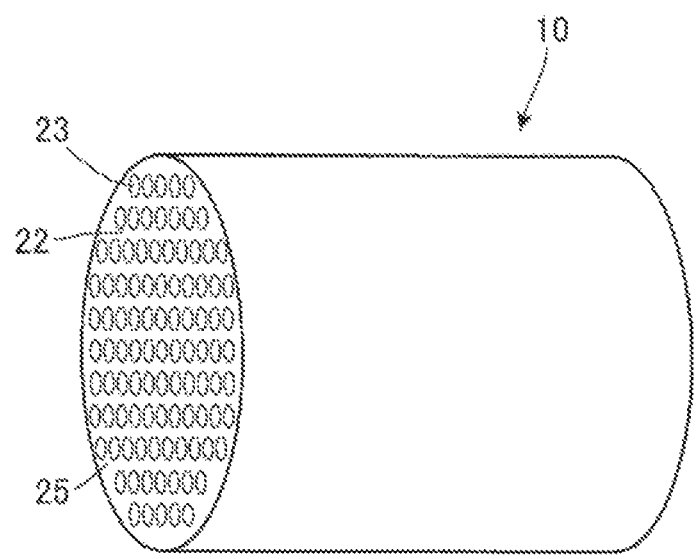
FIG. 2 is a perspective view illustrating a ceramic filter, which is an embodiment of the present invention.

Referring now to FIG. 2, an embodiment of a ceramic filter 10 in which the silica membrane 1 is formed by the manufacturing method in accordance with the present invention will be described. The ceramic filter 10 according to the present invention is shaped like a monolith having a plurality of cells 23, which are defined by partition walls 22 and which provide through channels in the axial direction. In the present embodiment, each of the cells 23 has a round cross-section and has the silica membrane 1, which is illustrated in FIG. 1, formed on the inner wall surface thereof. The cells 23 may alternatively be shaped to have a hexagonal cross-section or a quadrangular cross-section. With such a structure, if, for example, a mixture (e.g., water and acetic acid) is introduced into the cell 23 from an inlet end surface 25, then one of the components of the mixture is separated by the silica membrane 1 formed on the inner wall of the cell 23 and permeated through the porous partition wall 22 to be discharged from the outermost wall of the ceramic filter 10, thus allowing the mixture to be separated. In other words, the silica membrane 1 formed in the ceramic filter 10 can be used as a separating membrane, displaying high separation characteristic with respect to, for example, water and alcohol or water and acetic acid.

The porous substrate 11, which is the main body of the substrate, is formed by extrusion or the like as a columnar monolith filter element made of a porous material. As the porous material, alumina, for example, may be used because of the corrosion resistance and less changes in the pore diameters of the filtering portions, which are caused by temperature changes, and ensured adequate strength. Besides alumina, other ceramic materials, such as cordierite, mullite, or silicon carbide, may be used. The porous substrate 11 is a porous member having many pores of small diameters. The diameter of a pore in the surface (the uppermost surface layer) on which the silica membrane 1 is to be deposited preferably ranges from 0.5 to 20 nm or more preferably ranges from 0.5 to 10 nm. The surface of the porous member may have a porous membrane formed thereon, the porous membrane having the pores of the diameters in the aforesaid ranges (the UF membrane 14 has the uppermost layer of the aforesaid ranges in the embodiment illustrated in FIG. 1).

The silica membrane 1 according to the present invention is formed on the inner peripheral surface (the inner wall surface) of the porous substrate 11, so that the silica membrane 1 may ideally use a relatively lengthy tubular substrate having a length of 50 cm or more or a porous substrate shaped like a lotus root.

Figure 3A:
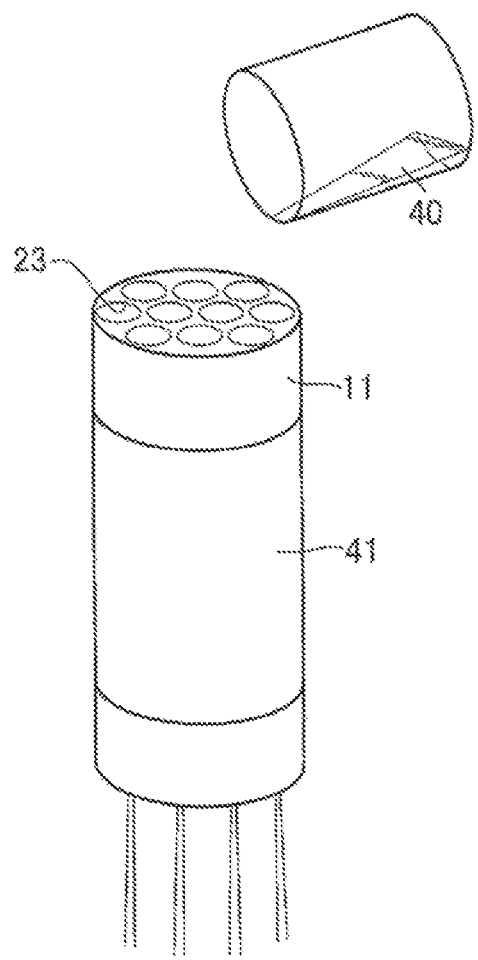
FIG. 3A is a schematic diagram which schematically illustrates an example of a method of manufacturing a silica membrane of a ceramic filter in accordance with the present invention and which illustrates a ceramic sol flowing down.
Figure 3B:
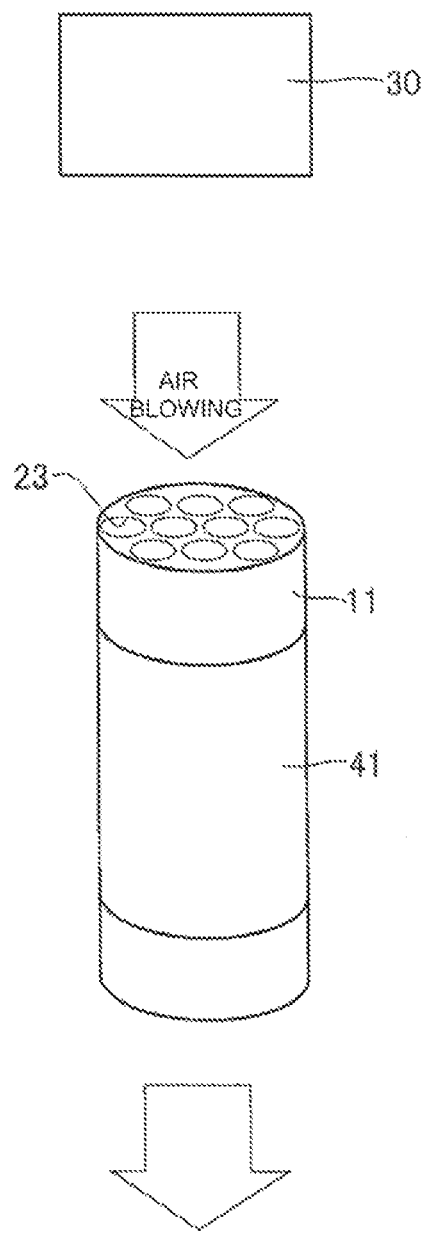
FIG. 3B is a schematic diagram which schematically illustrates an example of a method of manufacturing a silica membrane of a ceramic filter in accordance with the present invention and which illustrates drying by air blowing.

Referring now to FIG. 3A and FIG. 3B, the method of manufacturing the silica membrane 1 will be described. First, a coating liquid (a membrane formation silica-sol liquid) 40 for forming the silica membrane 1 is prepared. Tetraethoxysilane is hydrolyzed in the presence of nitric acid to obtain the silica-sol liquid, then the silica-sol liquid is diluted by ethanol such that the concentration of silica becomes 0.3 to 2 mass %, thereby producing the coating liquid (the membrane formation silica-sol liquid) 40.

Subsequently, the outer peripheral surface of the porous substrate 11 is masked by a masking tape 41, as illustrated in FIG. 3A. The aforesaid porous substrate 11 is fixed to, for example, the bottom end of a wide-mouthed funnel (not shown) and the aforesaid coating liquid (the membrane formation silica-sol liquid) 40 is poured into and through the cell 23 from above the substrate (the flow-down method). Alternatively, a flow-down membrane formation device may be used to pour the membrane formation silica-sol liquid 40 in the tank thereof. Thus, the silica sol is deposited on the surface of the cell 23. Then, air is blown onto the substrate to remove surplus silica sol.

Subsequently, as illustrated in, for example, FIG. 3B, air, the dew point of which is −70 to 0° C., is blown from above the porous substrate 11 by a dehumidification air blower 30 or the like to send the air into the cells thereby to dry the silica sol. The air having the dew point of −70 to 0° C. is obtained by, for example, adsorbing moisture by a dehumidification rotor having a honeycomb structure in which an adsorbent is firmly bound. The air-blow drying with air having the dew point of −70 to 0° C. enables the silica membrane 1 to be formed in a dense structure on the UF membrane 14, thus permitting the formation of a membrane with high separation performance. The velocity at which the air for drying passes through the cells is preferably 5 to 20 m/sec. If the velocity at which the air passes through the cells is 5 m/sec or less, then the time required for drying would be excessively long. If the velocity at which the air passes through the cells is 20 m/sec or more, then cracks undesirably tend to occur in the membrane surface. Drying by the air blowing as described above leads to the structure that enables the silica membrane 1 to be densely formed on the UF membrane 14. It is considered important that the solvent dries from the membrane surface, so that the outer peripheral surface may be masked to prevent the solvent containing the silica sol from vaporizing from the structure. The air-blow drying is preferably carried out immediately, e.g., within 30 seconds, after the silica sol is deposited. This is because starting the drying immediately after the formation of the membrane makes it possible to restrain the silica sol from infiltrating into the substrate.

The temperature of the air preferably ranges from 10 to 80° C. If air of a temperature which is below 10° C. is passed through the cells, then drying the silica sol on the surfaces of the cells would not proceed, preventing the formation of a dense membrane. This results in the formation of a membrane with large pore diameters. If hot air having a temperature above 80° C. is passed through the cells, then cracks undesirably tend to occur in the membrane surface.

Thereafter, the temperature is raised at 20 to 100° C./hour, maintained at 300 to 600° C. for 30 minutes to 3 hours, and then lowered at 20 to 100° C./hour. The process consisting of the pour-in of the coating liquid (the membrane formation silica-sol liquid) 40, drying, raising the temperature and lowering the temperature described above is repeated twice to five times.

The formation of the silica membrane 1 is not limited to the pour-in (the flow-down method) of the silica sol illustrated in FIG. 3A. Alternatively, a dip method may be used and then the air-blow drying illustrated in FIG. 3B may be carried out.

By carrying out the process described above and using the UF membrane 14 as the substrate, the silica membrane 1 is formed on the surface of the UF membrane 14.

The ceramic filter 10 having the nano-level thin film silica membrane 1, which has been obtained as described above, formed on the inner wall surfaces thereof can be ideally used as the filter for separating a mixed liquid or the like.

EXAMPLES

The following will described the present invention in further detail on the basis of examples. The present invention is, however, not limited to the examples.

Examples 1 to 9

Comparative Examples 1 and 2

(1) Porous Substrate

A monolith-shaped (180 mm outside diameter, 3 mm cell inside diameter×2000 cells, and 1000 mm long) substrate (a porous substrate 11), on which a titania UF membrane with pores having an average diameter of 10 nm was formed, was used. Both ends of the base member were sealed with glass.

(2) Silica Sol

Tetraethoxysilane was hydrolyzed in the presence of nitric acid to obtain the silica-sol liquid. Then, the silica-sol liquid was diluted by ethanol to make an adjustment such that 0.7 mass % is obtained in terms of silica, thereby producing the coating liquid (a membrane formation silica-sol liquid) 40.

(3) Membrane Formation

The outer peripheral surface of the porous substrate 11 was masked with the masking tape 41. The porous substrate 11 was fixed to a flow-down deposition apparatus. The membrane formation silica-sol liquid 40 was placed in a tank of the flow-down deposition apparatus, and the membrane formation silica-sol liquid 40 was poured in and through the cells 23 from above the substrate. Thereafter, air having an air velocity of 5 m/sec was blown from above the substrate so as to remove surplus silica sol. It was confirmed that the membrane formation process forms membranes on the entire inner walls.

(4) Drying

Air of room temperature was passed through the interiors of the cells 23 of the porous substrate 11, onto which the silica sol has been deposited by pouring in the membrane formation silica-sol liquid 40, within 30 seconds by using the dehumidification air blower 30 for 30 minutes to dry the silica sol. The air velocity was set to 5 to 20 m/sec and the blown-air dew point was set to −70 to 0° C. In comparative examples 1 and 2, a blown air having a blown-air dew point that is higher than 0° C. was used for drying.

(5) Firing

The masking tape was removed from the outer peripheral surface of the porous substrate 11. In an electric furnace, the temperature was raised at 25° C./hour, and maintained at 500° C. for an hour. Thereafter, the temperature was lowered at 25° C./hour. The process of (3) to (5) described above was repeated twice to obtain a specimen of the example.

(Assessment)

A separation test on water-ethanol was carried out. Specifically, an aqueous solution, which has a temperature of 70° C., an ethanol concentration of 90 mass %, and water of 10 mass %, was passed at a solution feeding speed of 12 L/min through the cells 23 of the monolith (the porous substrate 11) with the silica membrane 1 formed thereon. At this time, the pressure was reduced from the side surface of the substrate at a degree of vacuum of about 2 to about 5 Pa, and the transmitted liquid from the side surface of the substrate was collected by a liquid nitrogen trap. The separation factor was calculated from the ethanol concentrations of the transmitted liquid collected by the trap and the undiluted solution before the permeation. The separation factors and permeation fluxes are shown in Table 1.

The term "separation factor" refers to the value of the ratio between the ethanol concentration (mass %) and the water concentration (mass %) in the transmitted liquid with respect to the ratio between the ethanol concentration (mass %) and the water concentration (mass %) in the supplied liquid, as indicated by an expression given below. Further, the term "permeation flux" refers to the mass (kg) of all substances that have passed through the separation membrane per unit time (hour) and unit area (m²).

Separation factor=((ethanol concentration in transmitted liquid)/(water concentration in transmitted liquid))/((ethanol concentration in supplied liquid)/(water concentration in supplied liquid))

TABLE 1

|  | Drying | | Membrane | Performance | |
| --- | --- | --- | --- | --- | --- |
|  | Blown-air dew point (° C.) | Blown-air velocity (m/s) | formation No. of times | Separation factor | Permeation flux (kg/m²h) |
| Example 1 | 0 | 10 | 3 | 2000 | 2.3 |
| Example 2 | −10 | 10 | 2 | 2400 | 2.2 |
| Example 3 | −20 | 10 | 2 | 2700 | 2.2 |
| Example 4 | −50 | 10 | 2 | 3000 | 2.1 |
| Example 5 | −70 | 10 | 2 | 3100 | 2.1 |
| Example 6 | −20 | 1 | 2 | 800 | 2.35 |
| Example 7 | −20 | 5 | 2 | 2600 | 2.3 |
| Example 8 | −20 | 20 | 2 | 2800 | 2.2 |
| Example 1 | −20 | 30 | 2 | 1000 | 2.3 |
| Comparative example 1 | 15 | 10 | 4 | 500 | 2.0 |
| Comparative example 2 | 20 | 10 | 4 | 400 | 2.1 |

As shown in Table 1, examples 1 to 9 have demonstrated that setting the dew points of the blown air for drying the silica sol to the range of −70 to 0° C. reduces the number of times of the membrane formation process and improves the separation factor in contrast to comparative examples 1 and 2. Moreover, examples 1 to 5 and 7 and 8 demonstrated that setting the blown-air velocity to the range of 5 to 20 m/sec leads to significantly improved separation factors.

INDUSTRIAL APPLICABILITY

The present invention makes it possible to obtain a membrane having high separation performance and high permeation flux by a reduced number of times of membrane formation. A ceramic filter in which such silica membranes have been formed can be ideally used as a filter. Further, the ceramic filter in which nano-level thin film silica membranes have been formed on the inner wall surfaces thereof can be also employed for applications, such as the separation and removal in an acid or alkali solution or an organic solvent, where no organic filter can be used.

DESCRIPTION OF REFERENCE NUMERALS

1: silica membrane; 10: ceramic filter; 11: porous substrate; 14: UF membrane; 22: partition wall; 23: cell; 25: inlet end face; 30: dehumidification air blower; 40: coating liquid (membrane formation silica-sol liquid); and 41: masking tape.

The invention claimed is:

1. A method of manufacturing a silica membrane, comprising:
    depositing a silica sol on a porous substrate;
    drying the silica sol by blowing air, the air having a dew point of −70 to 0° C.; and
    firing the dried silica sol and porous substrate thereafter so as to form a silica membrane,
    wherein the air is at room temperature.

2. The method of manufacturing a silica membrane according to claim 1, wherein the silica sol is dried by the air blowing at an air velocity of 5 to 20 m/sec.

3. The method of manufacturing a silica membrane according to claim 1, wherein an outer peripheral surface of the porous substrate is masked to prevent a solvent in the silica sol from vaporizing, through the outer peripheral surface.

4. The method of manufacturing a silica membrane according to claim 1, wherein the drying by blowing air is started within 30 seconds of the silica sol being deposited.

5. The method of manufacturing a silica membrane according to claim 1, wherein a concentration of silica is 0.3 to 2 mass % in the silica sol.

\* \* \* \* \*